(12) United States Patent
Nishiyama

(10) Patent No.: US 7,867,305 B2
(45) Date of Patent: Jan. 11, 2011

(54) BAG-FILTER TYPE SMALL DEODORIZING AND DUST COLLECTING APPARATUS

(76) Inventor: Shinroku Nishiyama, c/o Nippon Metal Co., Ltd. 12-25, Kikawahigashi-4-chome, Yodogawa-ku, Osaka (JP) 532-0012

( * ) Notice: Subject to any disclaimer, the term of this patent is extended or adjusted under 35 U.S.C. 154(b) by 238 days.

(21) Appl. No.: 12/267,226

(22) Filed: Nov. 7, 2008

(65) Prior Publication Data
US 2009/0205501 A1   Aug. 20, 2009

(30) Foreign Application Priority Data
Feb. 16, 2008   (JP) .............................. 2008-064919

(51) Int. Cl.
*B01D 45/18* (2006.01)
(52) U.S. Cl. .......................... 55/302; 55/341.1; 55/430; 55/432; 96/222
(58) Field of Classification Search .................. 55/283, 55/302, 341.1, 430, 432, 433; 96/222
See application file for complete search history.

(56) References Cited

FOREIGN PATENT DOCUMENTS

JP   08010561 A   *   1/1996

* cited by examiner

*Primary Examiner*—Robert A Hopkins
(74) *Attorney, Agent, or Firm*—Ronald E. Greigg

(57) ABSTRACT

The bag-filter type small deodorizing and dust collecting apparatus including a feed pipe feeding deodorizing powder, a rotary valve discharging the deodorizing powder by a fixed amount, and a reflux pipe for refluxing the deodorizing powder from the rotary valve A blower is provided for refluxing the deodorizing powder. Furthermore a switchover gate is mounted on a discharge side of the rotary valve. Branch pipes are connected to the switchover gate, such that one branch pipe is connected to a discharging chamber and the other branch pipe is connected to the reflux pipe. Dust is collected while enabling deodorization, or in particular, enabling local deodorization of a foundry or the like, mainly, without a need for a large-scaled apparatus for circulation, supply and discharge of the activated carbon or the like used therein.

19 Claims, 4 Drawing Sheets

BAG-FILTER TYPE SMALL DEODORIZING AND DUST COLLECTING APPARATUS

CROSS-REFERENCE TO RELATED APPLICATION

This application is based on Japanese Patent Application 2008-64919 filed on Feb. 16, 2008.

BACKGROUND OF THE INVENTION

1. Field of the Invention

This invention relates to a bag-filter type small deodorizing and dust collecting apparatus for improving work environment in a foundry or the like which requires deodorization.

2. Description of the Prior Art

In the foundry or the like, a dust collector collecting and removing generated dust is installed as a solution to the dust. However, since the air discharged into the atmosphere has an unusual odor, a new problem of odor arises in the neighboring area.

To solve the problem, the air discharged from an air exhausting device into the atmosphere has been deodorized and desulfurized.

The dust collecting technology like this includes:

Patent Document 1, Publication No. 2006-122764;

Patent Document 2, Patent Publication No. 2002-35523; and

Patent Document 3, Patent Publication No. 2008-30010.

The dust collecting technology referred to in the above Patent Documents 1 and 2 is that a filter itself contains activated carbon, or quick lime is blown in for desulfurization purpose.

However, the filter containing the activated carbon has to be replaced frequently as the deodorization performance deteriorates. In the method of simply blowing the activated carbon or the quick lime, deodorization function can be fulfilled, however, when these substances are caught by the filter and are blown away (by backwashing or the like), the substances are only discharged, which is very inefficient.

Therefore, the invention provides for a reflux method in which the activated carbon and the quick lime are put into the bag-filter type dust collector, and the activated carbon and the quick lime falling from the bag filters are collected and put into the dust collector again.

According to the method, the activated carbon or the like can be reused, and the economic efficiency is improved.

The bag-filter type dust collector in Patent Document 3 is a large-scaled dust collector by which the dust in the whole foundry etc. is collected and its priority is primarily placed on a dust collecting function. Therefore, deodorization using the large-scaled dust collector requires a large amount of expensive activated carbon etc. In addition, although the odor can be removed from the air discharged out of the plant into the atmosphere, there remains a problem at the work field.

In other words, in the foundry for aluminum casting, aluminum die-casting or the like for example, using a core of a shell-mold etc. accompanying an odor, each molding machine generates the odor, and the problem that the frontline workers are exposed to the odor has not been solved.

In order to solve the problem, a small deodorizing and dust collecting apparatus, which can be installed near the molding machine is required.

In addition, the deodorizing property of the activated carbon itself etc. is degraded after long use, and at the same time, the deodorizing efficiency is degraded because the mixing ratio of the activated carbon etc. as the deodorizing powder is lowered due to the powder dust or the like which is sucked. Consequently, it is required to facilitate supply of new activated carbon and discharge of the old activated carbon.

Further, the conventional dust collecting apparatus needs to have a conveying device like a screw feeder to reflux the deodorizing powder, which raises the manufacturing cost.

OBJECT AND SUMMARY OF THE INVENTION

An object of this invention is to collect the dust while enabling deodorization, or in particular, enabling local deodorization of a foundry or the like, mainly, without a need for a large-scaled apparatus for circulation, supply and discharge of the activated carbon or the like used therein.

To achieve the above-mentioned object, the bag-filter type small deodorizing and dust collecting apparatus of this invention provides a bag-filter type dust collecting part provided with an air discharging device and a pulse-jet mechanism blowing the dust away from bag filters; and a deodorizing part performing deodorization by using deodorizing powder. A suction duct extending to the apparatus of dust collection is connected to the dust collecting part. The deodorizing part is provided with an opening/closing damper mounted on the suction duct, a feed pipe for feeding the deodorizing powder arranged at the suction duct at the position between the opening/closing damper and the dust collecting part, a rotary valve discharging the blown-away deodorizing powder from the dust collecting part by a fixed amount, a reflux pipe for reflux from the rotary valve to the dust collecting part, and a blower refluxing the deodorizing powder to the dust collecting part through the reflux pipe.

In the bag-filter type small deodorizing and dust collecting apparatus, according to this invention, the rotary valve is provided with a switchover gate on its discharge side, branch pipes are connected to the switchover gate, and one of the branch pipes is connected to a discharging chamber and the other branch pipe is connected to the reflux pipe.

In this invention, the apparatus of the dust collection may target a general dust collecting machine as well as the apparatus that emits an odor by itself such as an aluminum die-casting foundry machine using a shell molding core etc., or an evaporative pattern casting or the like. In other words, the air exhausted from the dust collecting machine can also be sent into the bag-filter type small deodorizing and dust collecting apparatus for deodorization.

By structuring the bag-filter type small deodorizing and dust collecting apparatus as described above, the deodorizing powder blown away from the filters can be refluxed by the rotary valve by an appropriate amount. When the deodorizing performance is degraded or the mixing ratio of the powder dust is increased, the flow is switched over from the reflux direction to the to the direction of discharging chamber by the switchover gate so that the deodorizing powder mixed with the powder dust can be discharged and new activated carbon or the like can be supplied according to the needs.

The function like this can be fulfilled only by the simple structure that the switchover gate is provided after the rotary valve and the flow path is branched, without providing a particularly large-scaled apparatus.

BRIEF DESCRIPTION OF THE DRAWINGS

The invention will be better understood and further objects and advantages thereof will become more apparent from the ensuing detailed description of a preferred embodiment, taken in conjunction with the drawings, in which.

DESCRIPTION OF THE PREFERRED EMBODIMENT

Preferred embodiment of the bag-filter type small deodorizing and dust collecting apparatus of this invention is described in detail hereinafter based on FIGS. 1 to 4. FIG. 4 is a flow chart showing the flow of the deodorizing powder P and the air. The description below is based on an aluminum die-casting foundry machine as the target apparatus for the dust collection as it is apt to emit bad odor from its core or the like.

Figure 1:
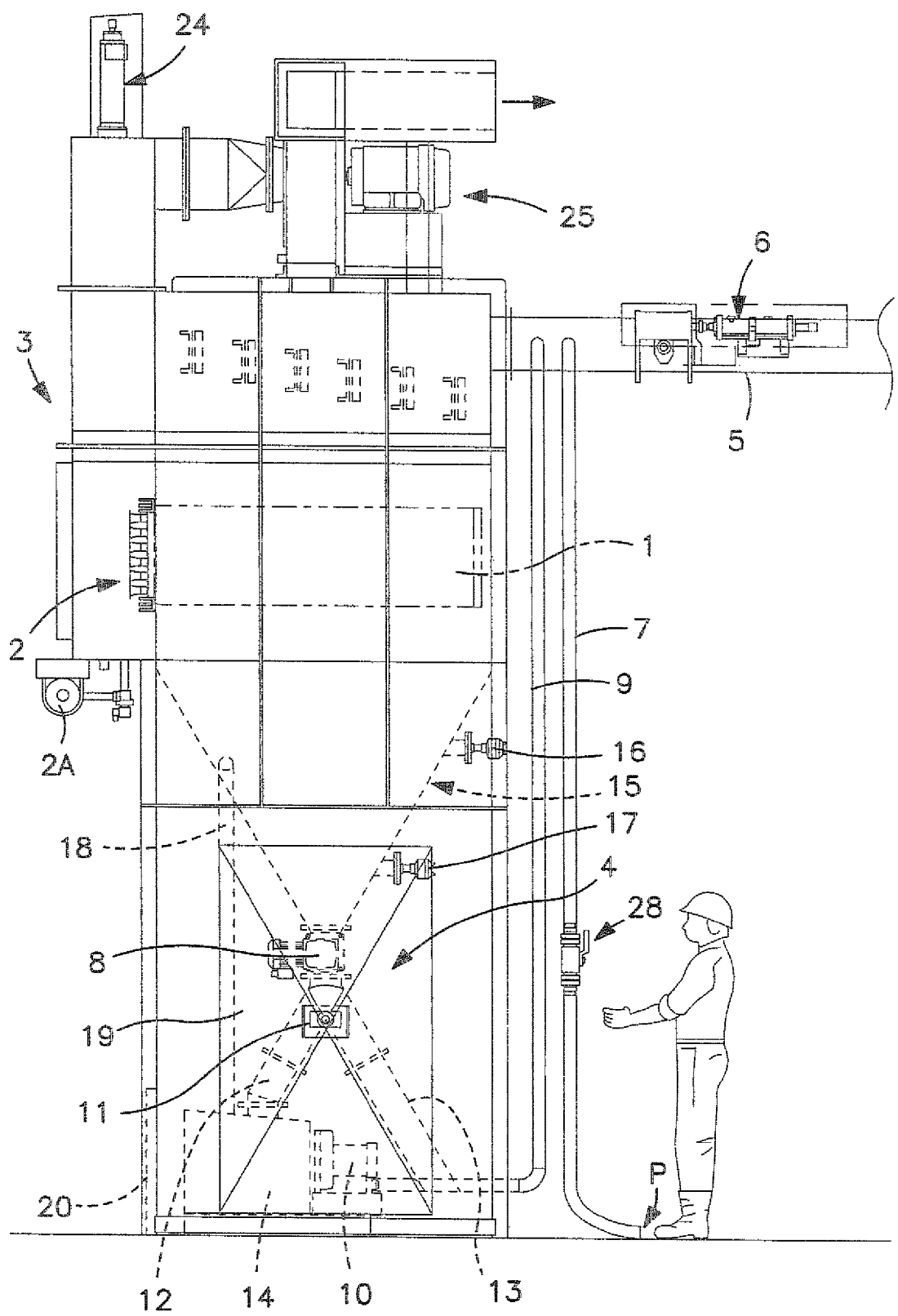
FIG. 1 is a front view of the whole bag-filter type small deodorizing and dust collecting apparatus of this invention.
Figure 2:
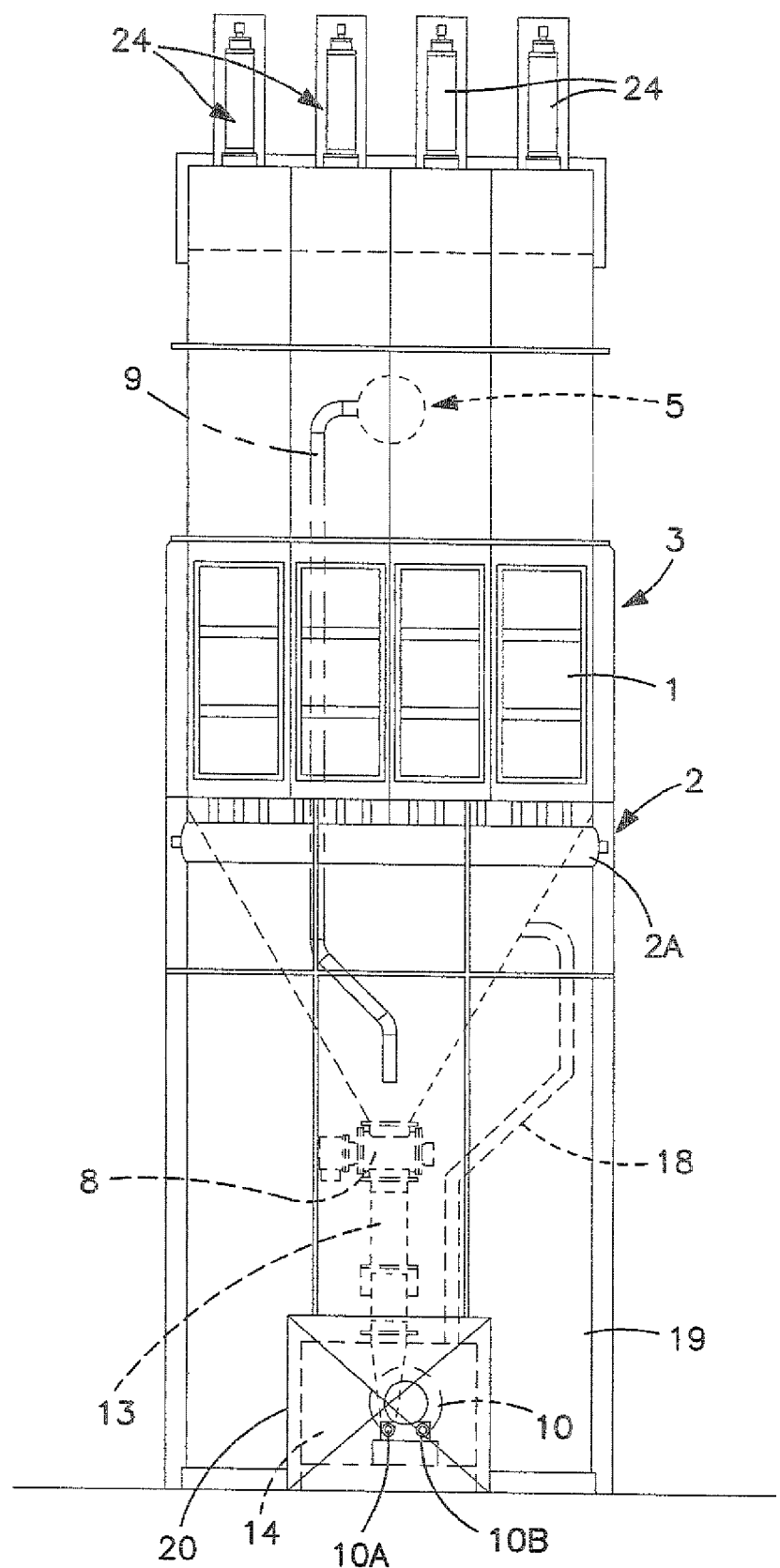
FIG. 2 is a side view of the whole bag-filter type small deodorizing and dust collecting apparatus of this invention.
Figure 3:
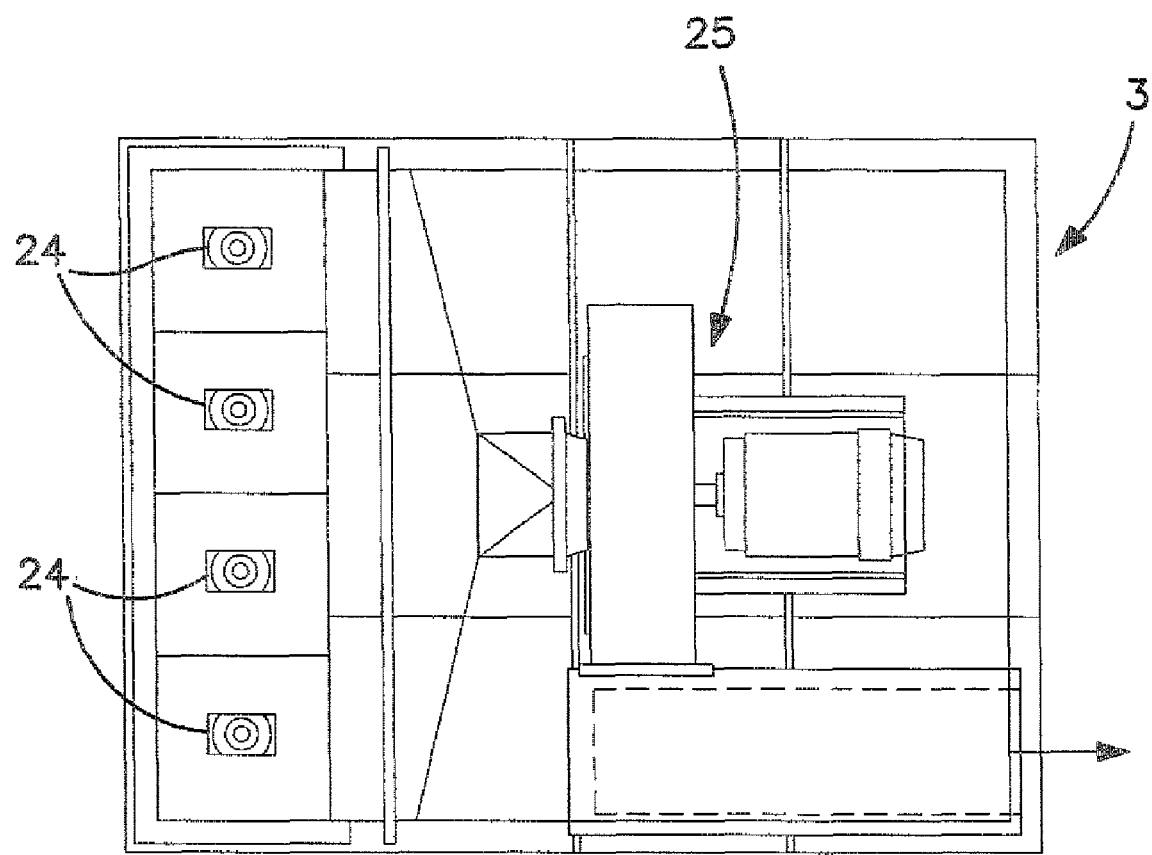
FIG. 3 is a plan view of the whole bag-filter type small deodorizing and dust collecting apparatus of this invention.
Figure 4:
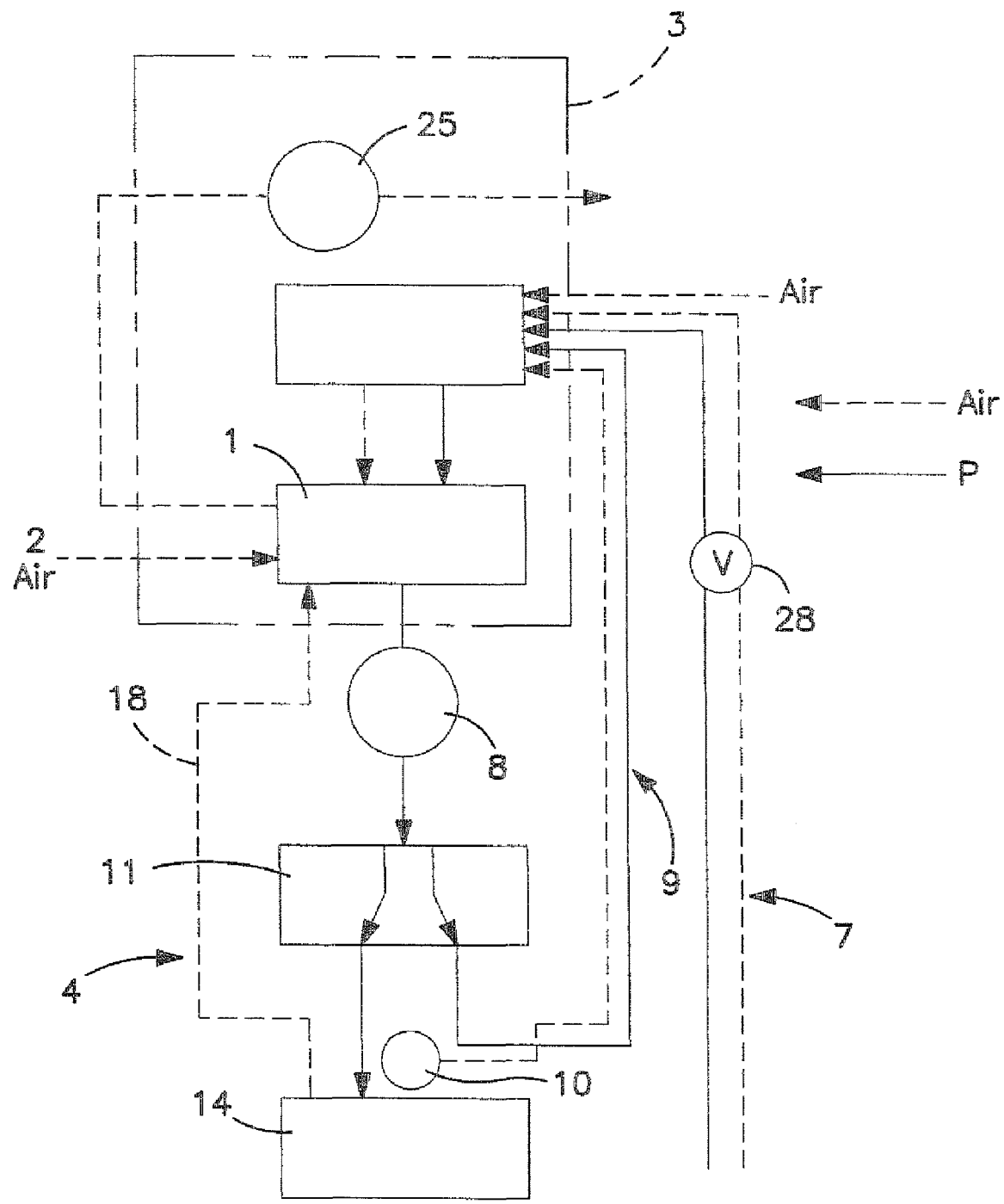
FIG. 4 is a flow chart of the bag-filter type small deodorizing and dust collecting apparatus of this invention.

As shown in FIGS. 1 to 3, the bag-filter type small deodorizing and dust collecting apparatus comprises the bag-filter type dust collecting part 3 provided with the air discharging device 25 and the pulse-jet means 2 blowing the dust away from the bag filters 1, and a deodorizing part 4 performing deodorization using the deodorizing powder P.

In the air discharge device 25 referred to in this embodiment, the air volume is 50 m3/min., a static pressure is −3.44 kPa, and a driving motor is 5.5 KW. The pulse-et means 2 uses the compressed air, which is drawn from a compressor in the foundry and is retained in a tank 2A. The pulse-jet provided with a number of nozzles is widely used and known to public, and description of the detailed structure thereof is omitted here.

The bag-filter type dust collecting part 3 is provided with a number of bag filters (fabric filters of Tetron felt) 1. In this embodiment, three bag filters (fabric filters) 1 are arranged in each of four partitioned chambers to have a whole filtering area of 62.4 m2. These four chambers are operated in sequence by four corresponding poppet dampers 24 etc. upon backwashing of the bag filters (fabric filters) 1 by a pulse-jet means 2 in each chamber, and are structured so that the air flow of a corresponding chamber may be cut off (filtering function stops). The structure of the pulse-jet means 2, is ordinary known. The poppet dampers 24 etc. are structured to operate a cylinder by the air and to operate a valve body (not shown in drawings).

A suction duct 5 (having a diameter of 270 mm in this embodiment) extending to the target apparatus of dust collection is connected to the dust collecting part 3. A hood, for example, is mounted on a front end of the suction duct 5 to facilitate the dust collecting.

The deodorizing part 4 comprises the opening/closing damper 6 mounted on the suction duct 5, a feed pipe 7 arranged at the suction duct 5 at the position between the opening/closing damper 6 and the dust collecting part 3 to feed the deodorizing powder P, the rotary valve 8 for discharging the blown-away deodorizing powder P from the dust collecting part 3 by a fixed amount, a reflux pipe 9 for the reflux from the rotary valve 8 to the dust collecting part 3, and a blower 10 for refluxing the deodorizing powder P to the dust collecting part 3 through the reflux pipe 9.

The opening/closing damper 6 operated by the air opens or cuts off the suction duct 5. The feed pipe 7 has a manually operable opening/closing valve 28 in its pathway.

The rotary valve 8 is a rotary which is partitioned into six chambers and driven by a motor for discharging the deodorizing powder P by a fixed amount, and does not have a special structure.

The reflux pipe 9 is similar to the feed pipe 7. The blower 10 refluxing the deodorizing powder P is what is called "a ring blower". In this embodiment, the air volume is 2.5 m3/min, the static pressure is −4.90 kPa, and the driving motor is 0.85 KW. A suction port 10A of the blower 10 is led out of the housing 19, which will be described later, and is opened. An exhausting port 10B is connected to the reflux pipe 9.

A hopper 15 is mounted under the bag filters 1. The rotary valve 8 is arranged at the bottom of the hopper 15. The hopper 15 is provided with upper and lower level detectors 16, 17 at a predetermined interval in a vertical direction.

These upper and lower detectors 16, 17 are the type that detect and indicate the existence of the deodorizing powder P in the hopper 15, which are known.

The rotary valve 8 is provided with the switchover gate 11 on its discharging side. Branch pipes 12, 13 are connected to the switchover gate 11. The branch pipe 12 is connected to the discharging chamber 14 and the other branch pipe 13 is connected to the reflux pipe 9.

In this embodiment, the switchover gate 11, which is manually operated, is to switch between two positions so that the deodorizing powder P may be sent only to either the branch pipe 12 or the branch pipe 13. The switchover gate 11 may also be structured to operate by electric power.

The branch pipes 12, 13 are two-way forked pipes and do not have special structures. The branch pipe 13 connected to the reflux pipe 9 in a manner of opening to the middle of the reflux pipe 9 suctions the deodorizing powder P by the negative pressure generated by the blow from the blower 10, and the deodorizing powder P is sent to the suction duct 5.

The reflux pipe 9 is connected to the suction duct 5 at the position between the opening/closing damper 6 and the dust collecting part 3. A lower end part of the reflux pipe 9 is cut off and omitted in FIG. 2 for the sake of simplicity.

Further, the discharging chamber 14 and the hopper 15 are connected to each other by means of the air discharge pipe 18. The discharging chamber 14 is provided with a box with a carriage, by which the collected deodorizing powder P to be discarded is carried out.

The air discharge pipe 18 has a small diameter, and a negative pressure is generated by opening to the hopper 15 so that the powder dust inside the discharging chamber 14 may return to the hopper 15, without stirring up and going out.

The discharging chamber 14, the rotary valve 8, the switchover gate 11, and the branch pipes 12, 13 are housed in the housing 19 which is provided with the discharging door 20 corresponding to the discharging chamber 14.

Thus, the housing 19 houses the constituent elements in a state of extending from the dust collecting part 3, and is provided with the discharging door 20 on a side through which the box with the carriage of the discharging chamber 14 is taken in and out.

As the deodorizing powder P, powder of activated carbon and quick lime mixed in the proportion of one to one is used in this embodiment, however, use of the activated carbon by 100% may also be possible. The grain size of the deodorizing powder P is 200 to 2000 mesh.

The amount of use of the deodorizing powder P is 0.05 to 0.3 g for the air volume of the dust collecting part 3 of 1 m3/min, in this embodiment.

Operation:

In the bag-filter type small deodorizing and dust collecting apparatus structured as described above, the dust collecting part 3 is operated first, the negative pressure is generated in the suction duct 5, and the opening/closing damper 6 is closed. After that, the opening/closing valve 28 in the pathway of the feed pipe 7 is opened, and a predetermined amount of the deodorizing powder P prepared by mixing the activated carbon and the quick lime at a predetermined mixing ratio is suctioned from the opening at the lower end.

After finishing supplying the deodorizing powder P, the opening/closing valve 28 is closed and the opening/closing damper 6 is opened to suction the air including the bad odor and the powder dust from the target apparatus of deodorization.

When predetermined amount of deodorizing powder P accumulates on the bag filters 1, the poppet damper 24 corresponding to the target chamber is closed and the pulse-jet means 2 is operated for so-called backwashing, whereby the deodorizing powder P is blown away, falls into a lower hopper 15 and is retained here.

The hopper 15 is provided with the rotary valve 8 on its lower part, in which the rotary valve 8 rotates to discharge the fixed amount of deodorizing powder P.

The discharged deodorizing powder P is guided in a predetermined direction through the branch pipes 12, 13 by the switchover gate 11, which is continued. The discharged deodorizing powder P usually reaches the branch pipe 13, which leads to the reflux pipe 9. A negative pressure is generated in the reflux pipe 9 because of the negative pressure caused by the air blown from the blower 10. The deodorizing powder P is suctioned by this negative pressure and is sent to the suction duct 5.

The deodorizing powder P is thus refluxed and fulfills the deodorizing function again. However, after the long-term use, the powder dust tentatively adheres and the absolute volume of the deodorizing powder P increases. In other words, the relative ratio of the activated carbon or the like lowers and intended deodorizing effect can not be expected.

When the absolute volume of the deodorizing powder P increases, the volume retained in the hopper 15 increases, which is detected by the upper level detector 16. Part or whole of the used deodorizing powder P is discharged according to this detection result, and the deodorizing powder P is replaced with new activated carbon or the like.

At this time, the switchover gate 11 is operated to guide the deodorizing powder P to the branch pipe 12 and then to the discharging chamber 14. The deodorizing powder P is then put in the box with the carriage, which is installed here, and is carried outside. At the same time, new deodorizing powder P is supplied through the feed pipe 7 in the same procedure as mentioned above.

The flow of the air and the deodorizing powder P is made clear in FIG. 4.

Thus, when the deodorizing powder P blown away from the bag filters 1 is refluxed by an appropriate amount by the rotary valve 8 and the deodorizing performance is degraded or the mixing ratio of the powder dust increases, the flow is switched over to the other using the switchover gate 11, so that the deodorizing powder P may be guided and discharged from the reflux direction to the discharging chamber 14, and new activated carbon or the like may be supplied as the need arises.

The function like this can be achieved only by the simple structure that the switchover gate 11 is provided after the rotary valve 8 to branch the flow path, without providing a particularly large-scaled apparatus.

The deodorizing powder P blown away from the bag filters 1 is once retained in the hopper 15, and is discharged from here by a fixed amount by the rotary valve 8. The amount of the deodorizing powder P is tentatively increased by the powder dust collected through long-term operation, which results in degradation of the deodorizing performance. The upper level detector 16 of the upper and lower level detectors 16, 17 detects the predetermined amount and switches over the switchover gate 11 easily to shift the flow from the usual reflux to the discharging direction. When the absolute volume of the deodorizing powder P runs short for any reasons, the fact is detected by means of the lower level detector 17 so that the deodorizing powder P may be supplied easily.

Since the reflux pipe 9 is connected to the suction duct 5 at the position between the opening/closing damper 6 and the dust collecting part 3, a large amount of air with the powder dust which is suctioned and the deodorizing powder P can be mixed in the suction duct 5 by the blower 10 in advance without directly refluxing the deodorizing powder P to the dust collecting part 3, it can undergo filtering action evenly over the whole bag filters 1 of the dust collecting part 3, so that the dust collecting and deodorizing performance can be enhanced.

The deodorizing powder P to be refluxed at the stage is conveyed with the air from the blower 10. At this point, the air and the deodorizing powder P are mixed together and sent into the suction duct 5. Since the negative pressure by an air discharging device 25 originally provided as the bag-filter type dust collecting part 3 is applied to the suction duct 5, there is also an advantage that the suction to the suction duct can be performed smoothly.

The deodorizing powder P which is degraded in its deodorizing function or which has an increased mixing ratio of impure substances is stirred up inside the discharging chamber 14 when the deodorizing powder P is led to the discharging chamber 14 by the switchover operation of the switchover gate 11. When the discharging door is opened to take out the deodorizing powder P, the stirred-up powder may come out. However, by connecting the discharging chamber 14 and the hopper 15 by the air discharge pipe 18, it can be returned into the hopper 15 utilizing the negative pressure of the hopper 15 for suctioning.

By housing the discharging chamber 14, the rotary valve 8, the switchover gate 11 and the branch pipes 12, 13 in the housing 19, leakage to the outside can be prevented, should the deodorizing powder P leak at any one of these sections.

Further, since the feed pipe 7 is provided with the opening/closing valve 28, the opening/closing valve 28 is opened to generate the negative pressure in the feed pipe 7 to have the deodorizing powder P suctioned into the suction duct 5 for supplying thereof only when the deodorizing powder P like the activated carbon is supplied. When it is not necessary, the opening/closing valve is closed to recover the initial suction force of the suction duct 5.

The deodorizing powder P preferably is the activated carbon or the mixed powder of the activated carbon and the quick lime.

By using the activated carbon, various odiferous gaseous matters can be deodorized, at least. By mixing the quick lime into the activated carbon, the quick lime reacts with sulfurous acid gas or the like and deodorization can be carried out. Needless to say, the mixing ratio of these two powders may be determined depending on the circumstances.

In this invention, a hopper 15 is preferably arranged under the bag filters 1, the rotary valve 8 is arranged at the bottom of the hopper 15, and the hopper 15 is provided with upper and lower level detectors 16, 17 at a predetermined interval in a vertical direction.

By structuring the apparatus as mentioned above, the deodorizing powder P blown away from the bag filters 1 is tentatively retained in the hopper 15, and is discharged from there by a fixed amount by means of the rotary valve 8. The amount of the deodorizing powder P is tentatively increased by the powder dust collected through long operation, resulting in degradation of the deodorizing effect. When the upper level detector 16 detects a predetermined amount, the operation for shifting the direction of the flow from the usual reflux to a discharging direction can be easily carried out by switching the switchover gate 11.

When the absolute volume of the deodorizing powder P runs short for any reasons, the fact is detected by means of the lower level detector 17, so that the deodorizing powder P can be supplied easily.

Further, the reflux pipe 9 is preferably connected to a suction duct 5 at the position between the opening/closing damper 6 and a dust collecting part 3.

By connecting the reflux pipe 9 to the suction duct 5 at the position between the opening/closing damper 6 and the dust collecting part 3, a large amount of air with powder dust which is suctioned and the deodorizing powder P can be mixed in the suction duct 5 by a blower 10 in advance without directly refluxing to the dust collecting part 3. Therefore, it can undergo filtration evenly over the whole bag filters 1 of the dust collecting part 3, whereby dust collecting and deodorizing efficiency can be improved.

The refluxed deodorizing powder P is conveyed with the air of the blower 10. At this time the air and the deodorizing powder P are mixed together and sent into the suction duct 5. Since a negative pressure generated by the air discharging device 25 which is initially provided as a bag-filter type dust collecting part 3 is applied to the suction duct 5, there is an advantage that suction into the suction duct 5 is carried out smoothly.

Further, the discharging chamber 14 and the hopper 15 are preferably connected to each other by means of an air discharge pipe 18.

Thus, by connecting the discharging chamber 14 and the hopper 15 to each other by the air discharge pipe 18, the powder is stirred up in the discharging chamber 14 when the deodorizing powder P (which is degraded in its deodorizing efficiency or is increased in the mixing ratio of impurities) is guided to the discharging chamber 14 by switching over the switch-over gate 11. When a discharging door is opened to take out the discharging chamber 14, the stirred-up powder is likely to be discharged outside, however, the powder can be returned into the hopper 15 by suctioning the powder using the negative pressure of the hopper 15.

The discharging chamber 14, the rotary valve 8, the switchover gate 11 and the branch pipes 12, 13 are housed in a housing 19, which is preferably provided with the discharging door 20 corresponding to the discharging chamber 14.

Thus, by housing the discharging chamber 14, the rotary valve 8, the switchover gate 11 and the branch pipes 12, 13 in the housing 19, leakage to the outside can be prevented even if the deodorizing powder P should leak at any part of them.

Further, the feed pipe 7 is preferably provided with an opening/closing valve 28. Thus, by mounting the opening/closing valve 28 on the feed pipe 7, the deodorizing powder P is suctioned and supplied through the suction duct 5 by generating the negative pressure in the feed pipe 7 by opening the opening/closing valve 28 only when the deodorizing powder P like the activated carbon is supplied. When unnecessary, the opening/closing valve 28 is closed so that the initial suction force of the suction duct 5 can recover.

Further, the deodorizing powder P preferably is the activated carbon, or a mixed powder of the activated carbon and the quick lime.

Various odiferous gaseous matters are deodorized at least by the activated carbon. In addition, by using the mixed powder of the activated carbon and the quick lime, deodorization by reaction of sulfurous acid gas etc. to the quick lime can be carried out.

Needless to say, the mixing ratio of these two powders may be determined properly according to the conditions.

The amount of use of the deodorizing powder P preferably is 0.05 to 0.3 g per air volume of the dust collecting part 3 of 1 m3/min.

It is the most preferable in terms of deodorization efficiency and a use cost to set the amount of use of the deodorizing powder P to be 0.05 to 0.3 g per air volume of 1 m3/min.

The bag-filter type small deodorizing and dust collecting apparatus of this invention is installed in a place like a foundry where odor is generated so that it can locally fulfill the deodorizing function, and can be applied to various target apparatuses.

According to the bag-filter type small deodorizing and dust collecting apparatus of this invention, the deodorizing powder which is used is usually refluxed by an appropriate amount by using a rotary valve, and when the deodorizing performance is degraded or the mixing ratio of the powder dust is increased, the flow can be switched over to the other by the switchover gate to discharge the deodorizing powder mixed with the powder dust from the discharging chamber. Then, new activated carbon or the like is supplied to recover the deodorizing performance, which is an advantage.

The remarkable effect like this can be achieved only by the simple structure that the switchover gate is provided after the rotary valve and the flow path is branched, without providing a particularly large-scaled apparatus.

The foregoing relates to the preferred exemplary embodiment of the invention, it being understood that other variants and embodiments thereof are possible within the spirit and scope of the invention, the latter being defined by the appended claims.

I claim:

1. A bag-filter type small deodorizing and dust collecting apparatus, comprising:
   a bag-filter type dust collecting part provided with a pulse-jet means for blowing dust away from an air discharging device and filters;
   a deodorizing part for deodorizing using deodorizing powder, in which a suction duct extending to a target apparatus for dust collection is connected to the dust collecting part, the deodorizing part being provided with
   an opening/closing damper mounted on the suction duct,
   a feed pipe provided at a position between the opening/closing damper and the dust collecting part to feed the deodorizing powder,
   a rotary valve for discharging the blown-away deodorizing powder from the dust collecting part by a fixed amount,
   a reflux pipe for refluxing the deodorizing powder from the rotary valve to the dust collecting part,
   a blower for refluxing the deodorizing powder to the dust collecting part through the reflux pipe,
   a switchover gate provided on a discharging side of the rotary valve, and branch pipes connected to the switchover gate, wherein one of the branch pipes being connected to a discharging chamber and an other of the branch pipes being connected to the reflux pipe.

2. The bag-filter type small deodorizing and dust collecting apparatus according to claim 1, further comprising
a hopper provided with the rotary valve arranged on the bottom of the hopper, and
upper and lower level detectors arranged on the hopper at a predetermined interval in a vertical direction.

3. The bag-filter type small deodorizing and dust collecting apparatus according to claim 1, wherein the reflux pipe is connected to the suction duct at a position between the opening/closing damper and the dust collecting part.

4. The bag-filter type small deodorizing and dust collecting apparatus according to claim 2, wherein the reflux pipe is connected to the suction duct at a position between the opening/closing damper and the dust collecting part.

5. The bag-filter type small deodorizing and dust collecting apparatus according to claim 1, further comprising
an air discharge pipe connecting the discharging chamber and a hopper to each other.

6. The bag-filter type small deodorizing and dust collecting apparatus according to claim 2, further comprising
an air discharge pipe connecting the discharging chamber and the hopper to each other.

7. The bag-filter type small deodorizing and dust collecting apparatus according to claim 3, further comprising
an air discharge pipe connecting the discharging chamber and a hopper to each other.

8. The bag-filter type small deodorizing and dust collecting apparatus according to claim 1, further comprising
a housing arranged to house the discharging chamber, the rotary valve, the switchover gate, and the branch pipes, and a discharging door mounted on the housing to correspond to the discharging chamber.

9. The bag-filter type small deodorizing and dust collecting apparatus according to claim 2, further comprising
a housing arranged to house the discharging chamber, the rotary valve, the switchover gate, and the branch pipes, and a discharging door mounted on the housing to correspond to the discharging chamber.

10. The bag-filter type small deodorizing and dust collecting apparatus according to claim 3, further comprising
a housing arranged to house the discharging chamber, the rotary valve, the switchover gate, and the branch pipes, and a discharging door mounted on the housing to correspond to the discharging chamber.

11. The bag-filter type small deodorizing and dust collecting apparatus according to claim 1, further comprising
an opening/closing valve mounted on the feed pipe.

12. The bag-filter type small deodorizing and dust collecting apparatus according to claim 2, further comprising
an opening/closing valve mounted on the feed pipe.

13. The bag-filter type small deodorizing and dust collecting apparatus according to claim 3, further comprising
an opening/closing valve mounted on the feed pipe.

14. The bag-filter type small deodorizing and dust collecting apparatus according to claim 1, wherein the deodorizing powder is a mixed powder of activated carbon and quick lime.

15. The bag-filter type small deodorizing and dust collecting apparatus according to claim 2, wherein the deodorizing powder is a mixed powder of activated carbon and quick lime.

16. The bag-filter type small deodorizing and dust collecting apparatus according to claim 3, wherein the deodorizing powder is a mixed powder of activated carbon and quick lime.

17. The bag-filter type small deodorizing and dust collecting apparatus according to claim 1, wherein an amount of use of the deodorizing powder is 0.05 to 0.3 g per air volume of the dust collecting part of 1 m3/min.

18. The bag-filter type small deodorizing and dust collecting apparatus according to claim 2, wherein an amount of use of the deodorizing powder is 0.05 to 0.3 g per air volume of the dust collecting part of 1 m3/min.

19. The bag-filter type small deodorizing and dust collecting apparatus according to claim 3, wherein an amount of use of the deodorizing powder is 0.05 to 0.3 g per air volume of the dust collecting part of 1 m3/min.

* * * * *